(12) United States Patent
Salecker et al.

(10) Patent No.: US 6,250,448 B1
(45) Date of Patent: Jun. 26, 2001

(54) MOTOR VEHICLE WITH AN AUTOMATICALLY ACTUATED CLUTCH

(75) Inventors: Michael Salecker, Stuttgart; Martin Zimmermann, Sasbach, both of (DE)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/567,497

(22) Filed: May 8, 2000

Related U.S. Application Data

(63) Continuation of application No. PCT/DE98/03304, filed on Nov. 5, 1998.

(30) Foreign Application Priority Data

Nov. 6, 1997 (DE) .............................................. 197 49 038

(51) Int. Cl.⁷ .................................................. F16D 23/00

(52) U.S. Cl. ........................ 192/103 F; 477/174; 477/78

(58) Field of Search ..................... 192/103 F; 477/174, 477/175, 176, 77, 78

(56) References Cited

U.S. PATENT DOCUMENTS

| 4,825,989 | 5/1989 | Frigger | 192/13 |
| 5,362,287 | * 11/1994 | Tanaka et al. | 477/175 |
| 5,568,387 | * 10/1996 | Andersson | 364/424.1 |
| 5,569,117 | 10/1996 | Kono et al. | 477/169 |

FOREIGN PATENT DOCUMENTS

| 35 28 389 | 2/1987 | (DE) . |
| 43 16 421 | 11/1994 | (DE) . |
| 196 22 572 | 12/1996 | (DE) . |
| 0 259 634 | 3/1988 | (EP) . |

* cited by examiner

Primary Examiner—Charles A Marmor
Assistant Examiner—Saúl Rodríguez
(74) Attorney, Agent, or Firm—Darby & Darby

(57) ABSTRACT

A motor vehicle is equipped with a device for automatically actuating a clutch in the drive train. A clutch actuator is directed by a control unit which, in turn, is responsive to a control signal from an electronic stability system (ESS). When the control signal indicates that the electronic stability system is in action, the actuator will set the degree of clutch engagement or the amount of torque that the clutch will transmit.

22 Claims, 3 Drawing Sheets

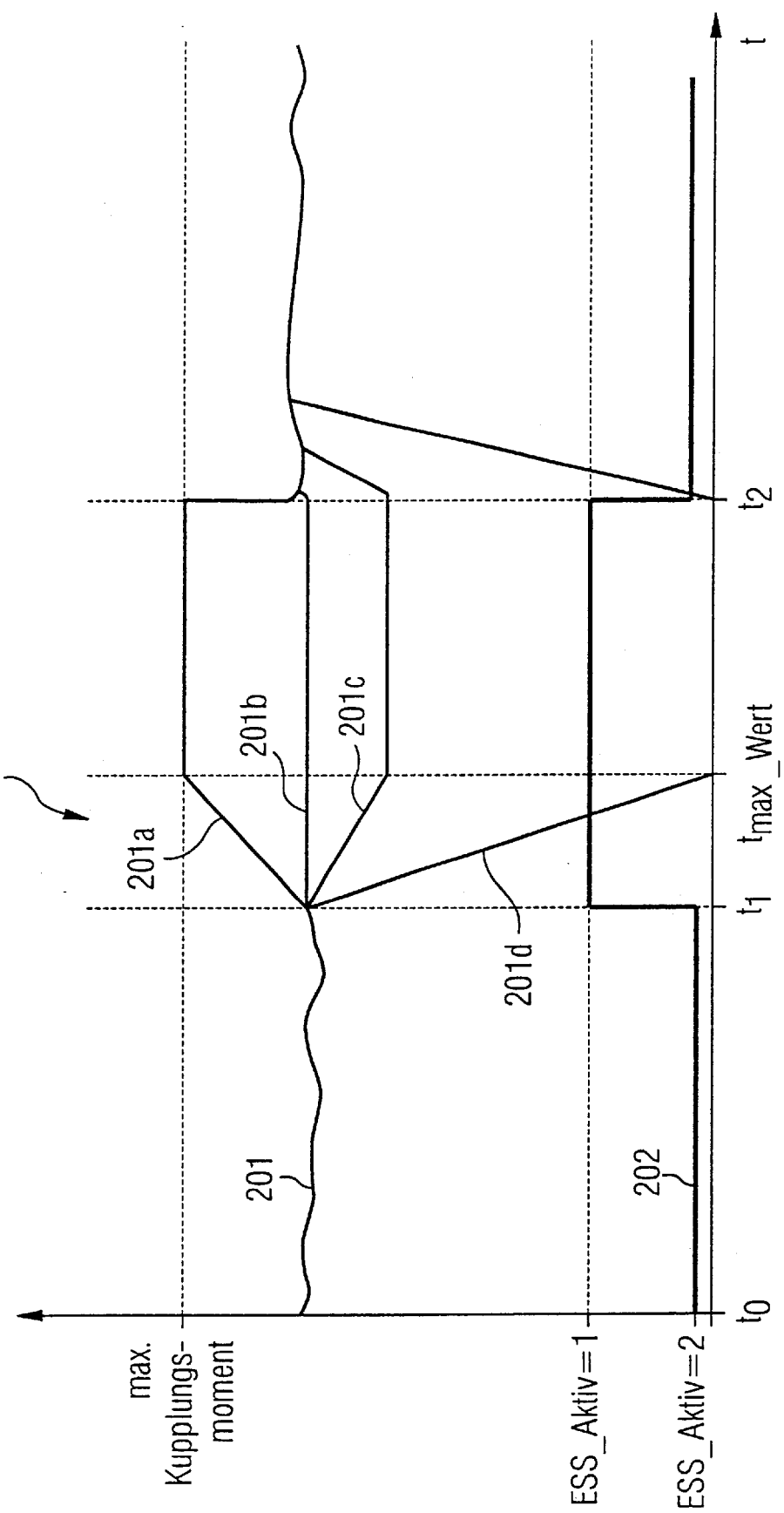

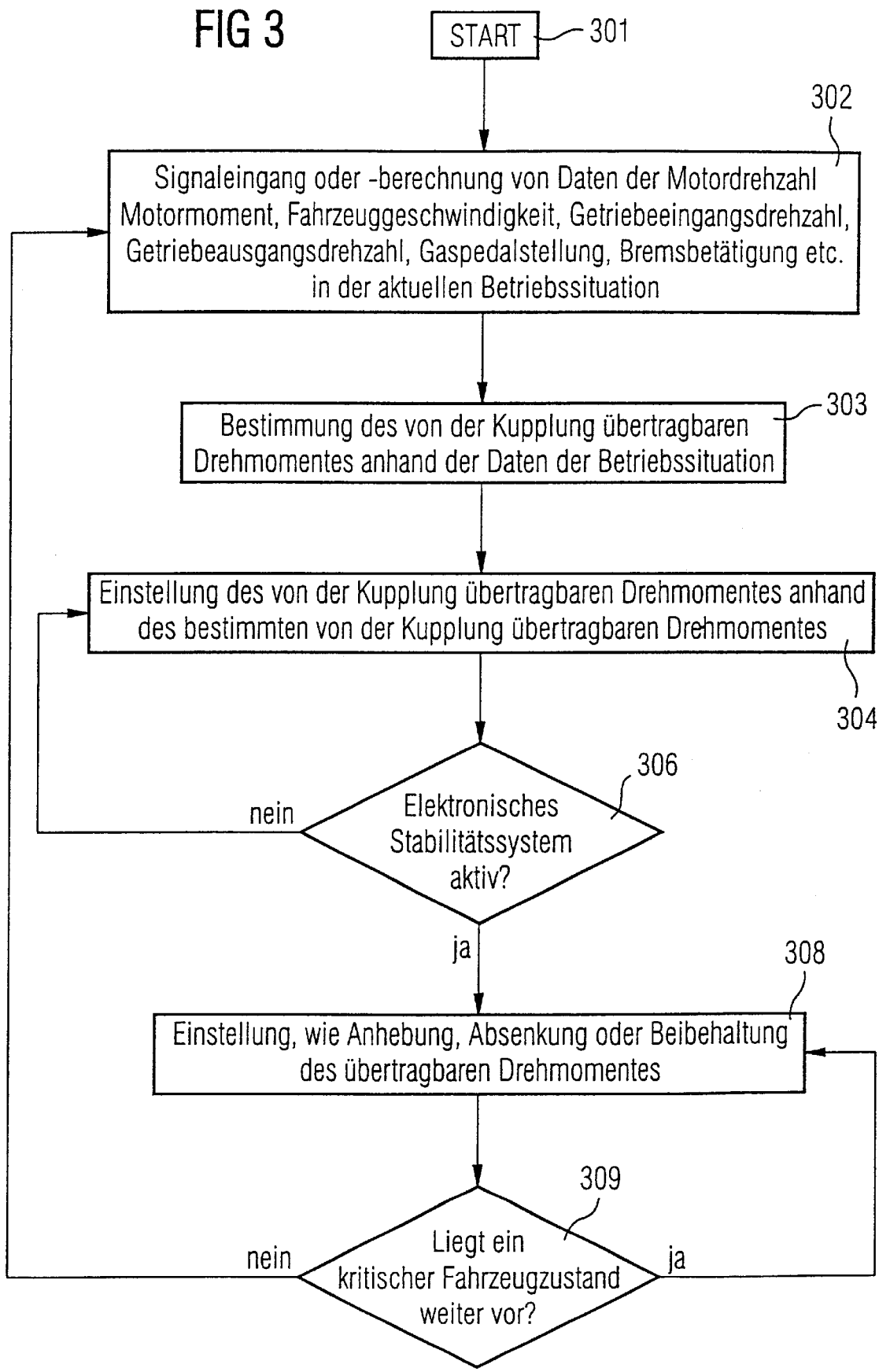

MOTOR VEHICLE WITH AN AUTOMATICALLY ACTUATED CLUTCH

This is a continuation of International Application No. PCT/DE98/03304, filed Nov. 5, 1998, the entire disclosure of which is incorporated by reference.

BACKGROUND OF THE INVENTION

The invention relates to a motor vehicle that is equipped with a device for automatically actuating a clutch in the drive train. The automated actuation of the clutch is directed by a control unit which, in turn, is responsive to a control signal from an electronic stability system (ESS). The control signal indicates when the electronic stability system is in action. The control unit controls an actuator that sets the magnitude of the torque that the clutch will be able to transmit. The invention further includes within its scope a process as performed by the inventive device.

Electronic stability systems for motor vehicles are generally known, for example from the DE publication "VDI-Report 1224". An electronic stability system of the known state of the art includes, e.g., an anti-lock braking system (ABS), an anti-slip regulating system (ASR) and/or a traction-control system. Based on signals generated by sensors, the stability system keeps track of the moving or traveling condition of the motor vehicle and compares the sensor signals received with typical sensor data of traveling situations stored in the electronic memory of the system. This allows the system to make an assessment of the current traveling situation. In case the current traveling situation deviates from normal, non-critical conditions that are stored in memory, or if the current traveling situation resembles any critical conditions that are stored in memory, the electronic stability system will transmit commands to actuator systems at the vehicle wheels and/or the vehicle engine in order to get the vehicle back into a non-critical state from the existing situation that has been identified as critical. This can be accomplished, for example, by applying the brakes to at least individual wheels or by a controlled cutback of engine power. A wheel slippage situation is managed by adjusting engine torque through a throttle-valve control or by adjusting the braking force at individual wheels though an anti-lock braking system. This reduces the power transferred through the slipping wheels and thereby cuts back on the slippage. The electronic stability system further comprises a sensor to detect rotations of the vehicle about a vertical axis, i.e., situations where the vehicle is about to spin out of control, so that the stability system can effectively counteract the problem by a controlled steering maneuver.

OBJECT OF THE INVENTION

The object of the present invention is to provide an increase in occupant safety in a motor vehicle equipped with an automatically controlled clutch and an electronic stability system. Another object of the invention is to further develop the control characteristics of the automated clutch and electronic stability system and of the associated control units so as to reduce or prevent the possibility of mutual interference between the respective regulating and controlling functions and to thereby contribute to an increase in safety.

SUMMARY OF THE INVENTION

The invention meets the objective by providing an arrangement where, in a case where the clutch is automatically actuated and there is an electronic signal indicating that the electronic stability system is in action, the control unit by means of an actuator causes the clutch to increase its torque-transmitting ability from the currently set level to a maximum amount of torque. The term torque-transmitting ability, within the present context, means the amount of torque that the clutch or other torque-transmitting device will be able to transmit in its current operating condition or state of engagement.

According to a further concept of the invention, the objective is also met in an arrangement where, in a case where the clutch is automatically actuated and there is an electronic signal indicating that the electronic stability system is in action, the control unit causes the clutch to maintain its torque-transmitting ability at the currently set level.

According to a further concept of the invention, the objective is also met in an arrangement where, in a case where the clutch is automatically actuated and there is an electronic signal indicating that the electronic stability system is in action, the control unit by means of the actuator causes the clutch to reduce its torque-transmitting ability from the currently set level to a lower amount of torque.

It is further advantageous if, in addition to the automated clutch action, the system also allows an automatic transmission to be controlled by means of at least one actuator and a control unit directing the actuator.

In a further embodiment, it is of practical value if in the presence of an electronic signal indicating that the electronic stability system is in action, the control unit by means of the actuator causes the clutch to change its torque-transmitting ability at a rate of increase or decrease that is equal to or faster than the rate of change that can be effected by the control unit in the absence of said electronic signal.

It is likewise of practical value if in the presence of an electronic signal indicating that the electronic stability system is in action, the control unit by means of the actuator causes the clutch to change its torque-transmitting ability at a rate of increase or decrease that is slower than the rate of change that can be effected by the control unit in the absence of an electronic signal.

It is further practical if in the presence of an electronic signal indicating that the electronic stability system is in action, the control unit by means of the actuator causes the clutch to change its torque-transmitting ability at a rate of increase or decrease that is equal to or faster than the rate of change that can be effected by the control unit in the absence of an electronic signal, even if in the absence of said electronic signal, the torque-transmitting ability or state of engagement of the clutch would remain essentially unchanged.

According to a further concept of the invention, the foregoing objective is also met if in the presence of an electronic signal indicating that the electronic stability system is in action, the control unit by means of the actuator causes the clutch to change its torque-transmitting ability at a rate of increase or decrease that is slower than the rate of change that can be effected by the control unit in the absence of an electronic signal, even if in the absence of said electronic signal, the torque-transmitting ability or state of engagement of the clutch would remain essentially unchanged.

According to a further inventive concept, the foregoing objective is also met by an arrangement where, in the presence of an electronic signal indicating that the electronic stability system is in action, the control unit causes the clutch to work at its maximum torque-transmitting ability, or in its fully engaged condition, at least as long as there is no signal directing the clutch to disengage, e.g., for the purpose of shifting gears.

It is further advantageous if the control unit generates a signal to engage or disengage the clutch only in the presence of a control signal that is generated and/or transmitted by the electronic stability system.

It is particularly advantageous if, following the occurrence of a signal indicating that an electronic stability system is in action and/or in the presence of a signal indicating the termination of an activity of an electronic stability system, the control unit causes the clutch to adjust its torque-transmitting ability to the current operating situation.

It is advantageous in practice if the torque-transmitting ability, after it has been adjusted to the current operating situation, takes on a value that lies in a range between a minimum amount and a maximum amount of torque that the clutch is allowed to transmit.

Specifically, it is practical, if the minimum amount is essentially zero and the maximum amount is the maximum value that can be set.

The scope of the invention further includes a process of controlling the amount of torque that can be transmitted through the clutch of a motor vehicle by means of an automated clutch-actuating device with a control unit directing the automated clutch action. Through a signal-transmitting connection, the control unit receives a signal from the electronic module of an electronic stability system that indicates when the electronic stability system is in action. The control unit directs an actuator in setting the amount of torque that can be transmitted by the clutch. Within this overall process, it is advantageous if the control unit performs the following steps to direct the automated actuation of the clutch:

a) determine the presence or absence of a signal announcing an activity of the electronic stability system, b) if an affirmative signal is present, direct the actuator to increase the torque-transmitting ability of the clutch from the currently set level to a maximum amount of torque-transmitting ability.

Under a further inventive concept for a process of controlling the amount of torque that can be transmitted through the clutch of a motor vehicle by means of an automated clutch-actuating device with a control unit directing the automated clutch action, it is advantageous if the control unit performs the following steps to direct the automated actuation of the clutch:

a) determine the presence or absence of a signal announcing an activity of the electronic stability system, b) if an affirmative signal is present, direct the actuator to decrease the torque-transmitting ability of the clutch from the currently set level to a selectable lower amount of torque.

Under a further inventive concept for a process of controlling the amount of torque that can be transmitted through the clutch of a motor vehicle by means of an automated clutch-actuating device with a control unit directing the automated clutch action, it is advantageous if the control unit performs the following steps to direct the automated actuation of the clutch:

a) determine the presence or absence of a signal announcing an activity of the electronic stability system, b) if an affirmative signal is present, direct the actuator to maintain the torque-transmitting ability of the clutch at the currently set amount of torque.

The novel features that are considered as characteristic of the invention are set forth in particular in the appended claims. The improved apparatus itself, however, both in its construction and its mode of operation, together with additional features and advantages thereof, will be best understood upon perusal of the following detailed description of certain presently preferred specific embodiment with reference to the accompanying drawing.

BRIEF DESCRIPTION OF THE DRAWING

FIG. 2 represents a graph illustrating dynamic behaviors of embodiments of a device according to the invention; and FIG. 3 represents a block diagram illustrating a sequence of operational steps performed by a device according to the invention.

DETAILED DESCRIPTION OF THE INVENTION

Figure 1:
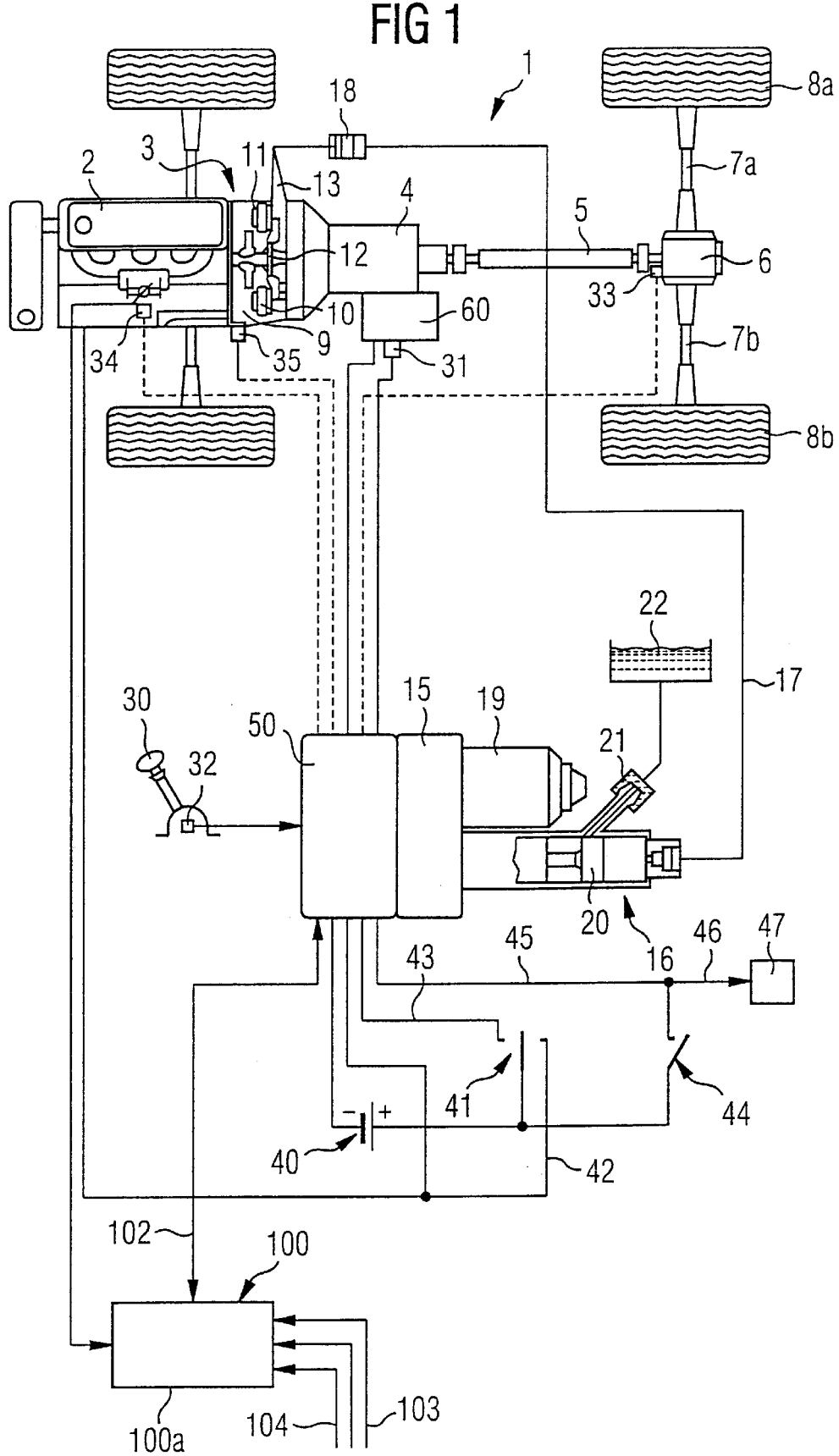
FIG. 1 represents a schematic view of a vehicle equipped with a device according to the invention.

FIG. 1 represents a motor vehicle 1 with an engine 2, e.g., an internal combustion engine, a clutch 3, e.g., a friction clutch, and a transmission 4. From the transmission, the drive train continues through a drive shaft 5, a differential 6, and two driving axles 7a and 7b which, in turn, transfer power to the driving wheels 8a and 8b of the vehicle.

The clutch 3 is shown as a friction clutch on a flywheel 9 of the internal combustion engine with a pressure plate 10, clutch disc 11, clutch release bearing 12, and clutch release fork 13. In the arrangement shown in FIG. 1, the clutch release fork is powered, and thus operated in a controlled way, by an actuator 15 with a master cylinder 16, a conduit 17 for a pressure medium, e.g., a hydraulic fluid, and a slave cylinder 18. The actuator 15 is shown as a pressure actuator with an electric motor 19 driving the master cylinder piston 20 by way of a gear drive (not shown), such as a worm drive and/or a spur-gear drive, so that the clutch or other type of torque-transmitting system can be engaged or disengaged by way of the pressure-fluid conduit 17 and the slave cylinder 18. The actuator further has within its housing an electronic control unit 50 with a microprocessor and a memory for operating and controlling the actuator 15, i.e., the power electronics as well as the control electronics can be arranged within the actuator housing. Furthermore, it can also be advantageous to arrange the power electronics for the control of the electric motor in a separate housing.

The actuator has a sniffle bore hole 21 connected to a reservoir 22 for the pressure medium. The control unit 50 is incorporated in the actuator 15, but it can also be installed in a separate housing.

The transmission 4, i.e., the different gear ratios of the transmission 4, can be shifted manually by means of a shift lever 30 that is mechanically connected to a selector element of the transmission, e.g., by cables, linkage rods, or pull ropes. The shift lever 30 can be shifted between the individual positions (gears) of the transmission and a neutral position. A shift-position sensor 31 connected to the shift lever and/or the selector element of the transmission, registers the current shift position and thus the currently engaged gear. In addition to detecting the current state, this sensor can also pick up an activity, i.e., movement, of the shift lever. The activity is registered by the electronic control unit and interpreted as an indication of an intent to shift gears. This will cause the clutch to be disengaged automatically at the start of the shifting process and to be re-engaged after the shifting process has been completed and the gears are in mesh. Furthermore, a separate shift-intent sensor 32 can be arranged at the shift lever to detect either a movement or an application of force to the shift lever. The control unit will interpret the sensor signals as an indication of an intent to shift gears and will disengage the clutch.

If the control of the transmission 4 is automated, the control unit 50 can also give commands to the actuator 60 that performs the work of shifting the transmission. The actuator 60 contains, e.g., electric motors and gear drives to move the internal shifting and position-setting elements of the transmission 4. The drive mechanisms convert the rotary motion of the output shaft of the electric motor into an actuator movement. A shift-position sensor 31 that is arranged at the transmission 4 of the vehicle or at the actuator 60 detects at least what gear the transmission is currently in and relays this information to the control unit 50.

The transmission can be operable manually by means of a shift lever, or automatically by means of an actuator that works under the command of a control unit.

The motor vehicle 1 with an automatic transmission 4 has a shift lever or, generally, a shift-actuator element 30 with at least a shift-intent sensor 32 or a shift-position sensor 31 that detects and sends a signal to the control unit when the driver intends to shift gears or is manipulating the transmission. The vehicle is further equipped with at least one rpm sensor 33 detecting the rate of rotation of the drive shaft or the rates of rotation of the wheels. The rpm sensor 33 can also be used as vehicle speed sensor. The vehicle is further equipped with a throttle valve sensor 34 detecting the throttle position, and an rpm sensor 35 detecting the rate of rotation of the engine.

The shift-position sensor 31 detects the position of internal shifter elements or the engagement of the respective gears of the transmission 4, so that the control unit 50 receives a signal indicating at least the currently engaged gear. Furthermore, by using an analog sensor it is possible to detect the movement of the internal shifter elements and thereby detect early which gear will be engaged next.

Furthermore, the control unit 50 can also consist of two or more individual control units that can be arranged either in the same housing or in different housings.

The at least one actuator 15 (and/or 60) is powered by a battery 40 through a permanent current-supply connection. The system further includes an ignition switch 41, normally of a multi-level type and normally operated by means of an ignition key. The ignition switch 41 activates the starter of the engine 2 through an electric connection 42. A signal is also sent through the electric circuit connection 43 to the electronic unit of the actuator 15, to activate the actuator 15 as the ignition is turned on. The system is further equipped with a sensor or switch 44, e.g., a brake pedal switch, that is connected to the control unit through an electric circuit connection 45. The sensor or switch 44 also serves as on/off switch for the circuit connection 46 that leads, e.g., to the brake light 47. Now, if the brake is actuated while the ignition is off, i.e., while the ignition switch 41 is open, the switch 44 will close the electric circuit connection 45 and thereby activate the actuator 15. Consequently, if the shift lever is operated before the ignition is switched on, the torque-transmitting system will be enabled to react in time and to disengage the clutch.

The embodiment as presented here is not limited to a pressure-operated system. There are also applications where it is practical to use purely mechanical devices to transmit the forces for disengaging the torque-transmitting system. Devices of this kind act on a clutch-release fork or clutch-release bearing either directly or through a rod linkage or a flexible connection.

The control unit 50 of the automated clutch and/or the automated transmission is interfaced through a signal connection 102 with a control unit 100a of an electronic stability system. The electronic stability system 100 in this example includes an anti-lock braking system (ABS) with wheel-rpm sensors and controllable valves to individually adjust the braking power of each wheel according to what the situation requires. In a situation where, e.g., an individual wheel locks up during a braking maneuver, the braking force in that wheel can be reduced by a targeted control of the valves in the hydraulic brake circuit until the locked condition disappears. It is of advantage if the electronic stability system further includes an anti-slip regulating system (ASR). If any of the wheels start slip, with a given amount of power being delivered to the wheels, the ASR will intervene to stop the slippage through a targeted application of the brakes to the respective wheel or wheels. This function is performed by means of wheel-rpm sensors and controllable valves to detect the slip condition and to apply a measured amount of braking force to individual wheels as required. For example, if a wheel slips as the driver is attempting to set the vehicle in motion from a stand-still, the ARS will apply or increase the brake-action at the particular wheel by a targeted control of the appropriate valve or valves in the hydraulic brake circuit of the wheel, until the slip condition disappears.

In a situation where the control unit 100 of the electronic stability system is directing a targeted brake application and/or a change in engine torque through an automated intervention by means of a throttle-valve actuator, the control unit 100 of the electronic stability system will send a signal to the electronic control unit 50 to indicate that an ESS activity is taking place. On receiving the activity signal, the electronic control unit 50, in turn, sets a control flag signifying that the ESS is in an active state.

When this flag is on, the electronic control unit 50 will take control over the amount of torque that the torque-transmitting system will transmit or over the degree of engagement of the torque-transmitting system with the features described above, so that in an advantageous embodiment of the invention, the clutch is moved at least at a slower rate from its current state of engagement to the fully engaged condition. The purpose of actuating the clutch more slowly in comparison to the normal speed of actuation is to avoid an unwanted reaction that would counteract the control of the electronic stability system.

In another advantageous embodiment of the invention, the clutch is left at its current position of engagement because the absence of a change will not cause an unwanted reaction that would counteract the control of the electronic stability system.

In a further advantageous embodiment of the invention, the clutch is moved at least at a slower rate from its current state of engagement to a state of lesser engagement. The purpose of this measure is to change the clutch from a locked condition to an at least partially slipping condition in order to cut back the amount of power transmitted to the wheels and to thereby counteract a critical travel situation. The purpose of actuating the clutch more slowly in comparison to the normal speed of actuation is to avoid an unwanted reaction that would counteract the control of the electronic stability system.

In addition to wheel-rpm sensors, travel-speed sensors and in some cases steering-angle sensors to measure the turning angle of the wheels, the electronic stability system 100 also has a yaw sensor to measure the rate at which the vehicle turns about its vertical axis. In addition, the electronic stability system 100 can also include pressure sensors to measure the hydraulic pressure in the brake system as well as a transverse acceleration sensor to measure the transverse acceleration component of the vehicle's motion. By evaluating the sensor signals and by comparing the data characterizing the current travel situation with data of reference situations that are stored in memory, it is possible to take remedial action in critical travel situations. Such critical situations include, e.g., spinning out of control or tipping over.

In the diagram of FIG. 2, the torque 201 that can be transmitted through the clutch and a flag signal 202 are plotted as a function of time. The flag signal 202 indicates whether an electronic stability system 100 is active, i.e., sending a signal (ESS_ACTIVITY=1), and has therefore been recognized by the control unit 50 as being active.

In the time interval from $t_o$ to $t_1$, the electronic stability system is inactive as indicated by the signal flag ESS_ACTIVITY=0, and the transmittable clutch torque 201 is regulated at a level between zero and a maximum value as required in the given situation and depending on the amount of engine torque. At the time $t_1$, the ESS control enters into action, and the transmittable clutch torque is increased in accordance with the branch 201$a$ of the torque curve, reaching the maximum torque level CTmax at the time $t_{CTmax}$. From the time $t_{CTmax}$ to the time $t_2$, the electronic stability system remains active, and the control keeps the transmittable torque 201 at the maximum level. At the time $t_2$, the ESS returns to an inactive state (ESS_ACTIVITY= 0), and the amount of transmittable clutch torque 201 is reduced to a level appropriate for the current operating situation.

In a further embodiment, the amount of transmittable clutch torque is held constant during the time when the ESS activity signal is on (ESS_ACTIVITY=1), as represented by the branch 201$b$ of the torque curve. It can also be advantageous, if the transmittable clutch torque is reduced at least to some extent, as represented by the branch 201$c$ of the torque curve, during the presence of an activity signal ESS_ACTIVITY=1, e.g., to cause the clutch to slip and thereby limit the amount of power reaching the wheels. According to yet a further embodiment, it can also be advantageous if the amount of transmittable clutch torque is cut down to zero (branch 201$d$ of the torque curve) during the time when the ESS activity signal is on (ESS_ACTIVITY=1).

The speed at which the clutch engagement is performed between the times $t_1$ and $t_{CTmax}$ is the greater of the two values $v_{actual}$ and $v_{given}$, where $v_{actual}$ is the actual speed at any point in time during the clutch engagement and $v_{given}$ is a given target parameter. As long as $v_{actual}$ is greater than $v_{given}$, the clutch engagement proceeds at the speed $v_{actual}$, until $v_{actual}$ becomes smaller than $v_{given}$, at which point the clutch engagement is completed at the speed $v_{given}$.

The curve 202 in the graph of FIG. 2 represents the state of a signal or flag ESS_ACTIVITY indicating a condition of an electronic stability system. A signal value of ESS_ACTIVITY=0 indicates that the electronic stability system is currently inactive, while a signal value significantly different from zero, e.g., ESS_ACTIVITY=1, indicates that an ESS activity is currently taking place.

The present invention is further related to the earlier patent application DE 195 04 847 which, by virtue of this reference, is made part of the disclosure of the present patent application.

The device according to the invention has the advantage that the slippage occurring, e.g., at a wheel is not present, or only to an insignificant extent, at the clutch and that the control units of the anti-slip regulator system and the clutch and/or transmission-actuator system are not interfering to any significant degree with each other.

FIG. 3 presents a block diagram 300 for the control of the torque that can be transmitted by the clutch. The control process is started in block 301, e.g., in a subroutine of the control program. The start of the process can be initiated by an event such as a signal generated by a control unit, e.g., based on a comparison of the wheel-rpm rates against a given limit for the difference between wheel-rpm rates. The start subroutine can also be called up as a repetitive loop in the time cycle of the main program, e.g., every 10 to 100 milliseconds.

In block 302, the current operating state of the vehicle is registered based on at least a subset of the data that characterize the current state of the vehicle, i.e., engine rpm, engine torque, transmission input rpm, transmission output rpm, travel speed of the vehicle, position of the accelerator pedal, current gear-shift position of the transmission, actuation of brakes, wheel rpm's, steering angle, yaw rate, etc. From these data or signals that are acquired by means of sensors or generated by other electronic units and transmitted to the electronic control unit 50, a determination (represented by block 303) is made of the amount of torque-transmitting ability to be set for the clutch.

Block 304 represents the step of setting or regulating by means of a control signal the amount of torque that can be transmitted through the clutch as determined in block 303.

Block 306 represents the step of interrogating and evaluating the signal that indicates whether the electronic stability system (ESS) is active or inactive. If the ESS is found to be inactive, the program loops back to block 304. Alternatively, the program could also loop back to block 302 or block 303. If the ESS is found to be active, the program proceeds to block 308 in which the torque to be transmitted by the clutch is, for example, raised to its maximum value at a rate of increase corresponding to at least the normal operating speed of the actuator. It is also possible to select a maximum speed of actuator movement.

Block 309 represents the step of interrogating whether a critical operating state of the vehicle continues to exist and/or whether the ESS continues to be active. In the affirmative case, the program loops back to block 308 and continues to increase or maintain the engagement of the clutch. In the negative case, the program proceeds to block 302 and regulates the clutch to transmit the amount of torque that is normal for the present operating situation. For example in the case of a control process where the transmitting capacity is adapted to the operating situation, if the currently delivered engine torque represents only a part of the maximum transmittable torque value, the clutch can be partially disengaged again at this point so that according to the method of adjusting the torque-transmitting capacity, the transmittable amount of torque is set at a level (expanded by a tolerance band) corresponding to the currently delivered engine torque.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A motor vehicle with a drive train containing a device for automatically actuating a clutch, and within said device
    a control unit with a signal-transmitting connection to an electronic stability system that issues a signal to indicate when the electronic stability system is in action, and as a further part of said device
    an actuator that sets the clutch as directed by the control unit, so that a controlled amount of torque can be transmitted through the clutch,
wherein in a case where the clutch is automatically actuated and the signal indicates that the electronic stability system is in action, the control unit by means of the actuator takes control over the amount of torque that can be transmitted through the clutch.

2. The motor vehicle of claim 1 wherein, when the signal indicates that the electronic stability system is in action, the control unit by means of the actuator causes the amount of torque that can be transmitted through the clutch to be increased from a currently set amount to a maximum amount of torque.

3. The motor vehicle of claim 2, wherein the control unit by means of the actuator causes the amount of torque that can be transmitted through the clutch to be increased at an equal or faster rate than can be effected by the control unit when there is no signal indicating that the electronic stability system is in action.

4. The motor vehicle of claim 2, wherein the control unit by means of the actuator causes the amount of torque that can be transmitted through the clutch to be increased at a slower rate than can be effected by the control unit when there is no signal indicating that the electronic stability system is in action.

5. The motor vehicle of claim 3, wherein the control unit by means of the actuator causes the amount of torque that can be transmitted through the clutch to be increased at an equal or faster rate than can be effected by the control unit when there is no signal indicating that the electronic stability system is in action, even if without said signal the amount of torque that can be transmitted through the clutch would remain essentially unchanged.

6. The motor vehicle of claim 4, wherein the control unit by means of the actuator causes the amount of torque that can be transmitted through the clutch to be increased at a slower rate than can be effected by the control unit when there is no signal indicating that the electronic stability system is in action, even if without said signal the amount of torque that can be transmitted through the clutch would remain essentially unchanged.

7. The motor vehicle of claim 1 wherein, when the signal indicates that the electronic stability system is in action, the control unit by means of the actuator causes the amount of torque that can be transmitted through the clutch to be maintained at a currently set amount of torque.

8. The motor vehicle of claim 1 wherein, when the signal indicates that the electronic stability system is in action, the control unit by means of the actuator causes the amount of torque that can be transmitted through the clutch to be decreased from a currently set amount to a smaller amount of torque.

9. The motor vehicle of claim 8, wherein the control unit by means of the actuator causes the amount of torque that can be transmitted through the clutch to be decreased at an equal or faster rate than can be effected by the control unit when there is no signal indicating that the electronic stability system is in action.

10. The motor vehicle of claim 8, wherein the control unit by means of the actuator causes the amount of torque that can be transmitted through the clutch to be decreased at a slower rate than can be effected by the control unit when there is no signal indicating that the electronic stability system is in action.

11. The motor vehicle of claim 9, wherein the control unit by means of the actuator causes the amount of torque that can be transmitted through the clutch to be decreased at an equal or faster rate than can be effected by the control unit when there is no signal indicating that the electronic stability system is in action, even if without said signal the amount of torque that can be transmitted through the clutch would remain essentially unchanged.

12. The motor vehicle of claim 10, wherein the control unit by means of the actuator causes the amount of torque that can be transmitted through the clutch to be decreased at a slower rate than can be effected by the control unit when there is no signal indicating that the electronic stability system is in action, even if without said signal the amount of torque that can be transmitted through the clutch would remain essentially unchanged.

13. The motor vehicle of claim 1, further comprising at least one control unit directing an actuator performing an automated actuation of a transmission.

14. The motor vehicle of claim 1 wherein, when there is a signal indicating that the electronic stability system is in action, the control unit by means of the actuator causes the amount of torque that can be transmitted through the clutch to be increased from a currently set amount to a maximum amount of torque at least as long as there is no signal directing the clutch to disengage.

15. The motor vehicle of claim 1, wherein the control unit generates a command signal to change a degree of engagement of the clutch only in the presence of a signal from the electronic stability system.

16. A motor vehicle of claim 1, wherein after an occurrence of a signal indicating that the electronic stability system is in action, the control unit by means of the actuator causes the amount of torque that can be transmitted through the clutch to be adapted to a current operating situation.

17. A motor vehicle of claim 1, wherein at an occurrence of a signal indicating that an activity of the electronic stability system has been terminated, the control unit by means of the actuator causes the amount of torque that can be transmitted through the clutch to be adapted to a current operating situation.

18. The motor vehicle of claim 17, wherein the amount of torque that has been adapted to the current operating situation takes on a value that lies in a range between a minimum amount and a maximum amount of torque that can be transmitted by the clutch.

19. The motor vehicle of claim 18, wherein the minimum amount is essentially zero and the maximum amount is an upper limit amount of torque that can be set in the clutch.

20. A process of controlling an amount of torque that can be transmitted through a clutch of a motor vehicle by means of an automated clutch-actuating device that is directed by a control unit receiving a signal through a signal-transmitting connection from an electronic module of an electronic stability system, said signal indicating when the electronic stability system is in action and said control unit directing an actuator in setting an amount of torque that can be transmitted by the clutch, said process comprising in the course of an automated actuation of the clutch the steps of:
   a) determining whether a signal is present that indicates that the electronic stability system is in action, and
   b) if a signal is present that indicates that the electronic stability system is in action, directing the actuator to increase the amount of torque that can be transmitted through the clutch from a currently set amount to a maximum amount of torque.

21. A process of controlling an amount of torque that can be transmitted through a clutch of a motor vehicle by means of an automated clutch-actuating device that is directed by a control unit receiving a signal through a signal-transmitting connection from an electronic module of an electronic stability system, said signal indicating when the electronic stability system is in action and said control unit directing an actuator in setting an amount of torque that can be transmitted by the clutch, said process comprising in the course of an automated actuation of the clutch the steps of:

a) determining whether a signal is present that indicates that the electronic stability system is in action, and b) if a signal is present that indicates that the electronic stability system is in action, directing the actuator to decrease the amount of torque that can be transmitted through the clutch from a currently set amount to a smaller amount of torque.

22. A process of controlling an amount of torque that can be transmitted through a clutch of a motor vehicle by means of an automated clutch-actuating device that is directed by a control unit receiving a signal through a signal-transmitting connection from an electronic module of an electronic stability system, said signal indicating when the electronic stability system is in action and said control unit directing an actuator in setting an amount of torque that can be transmitted by the clutch, said process comprising in the course of an automated actuation of the clutch the steps of:

a) determining whether a signal is present that indicates that the electronic stability system is in action, and b) if a signal is present that indicates that the electronic stability system is in action, directing the actuator to maintain the amount of torque that can be transmitted through the clutch at a currently set level.

\* \* \* \* \*